June 5, 1951  J. J. VON EDESKUTY ET AL  2,555,908
STARCH GLUTEN SEPARATION
Filed April 28, 1949  2 Sheets-Sheet 2
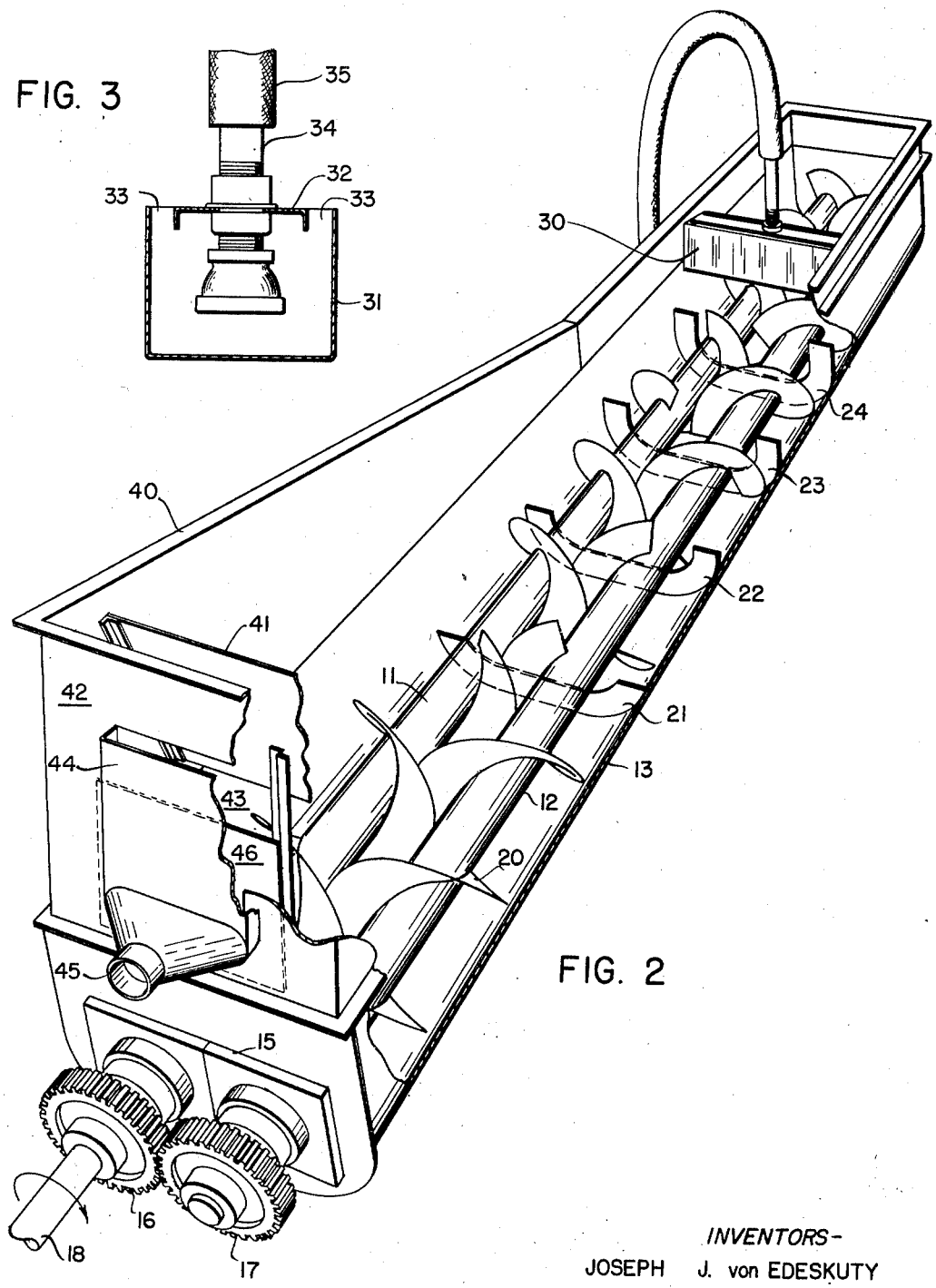
INVENTORS-
JOSEPH J. von EDESKUTY
JOHN F. ZALAR
BY Anthony A. Juettner
ATTORNEY Patented June 5, 1951

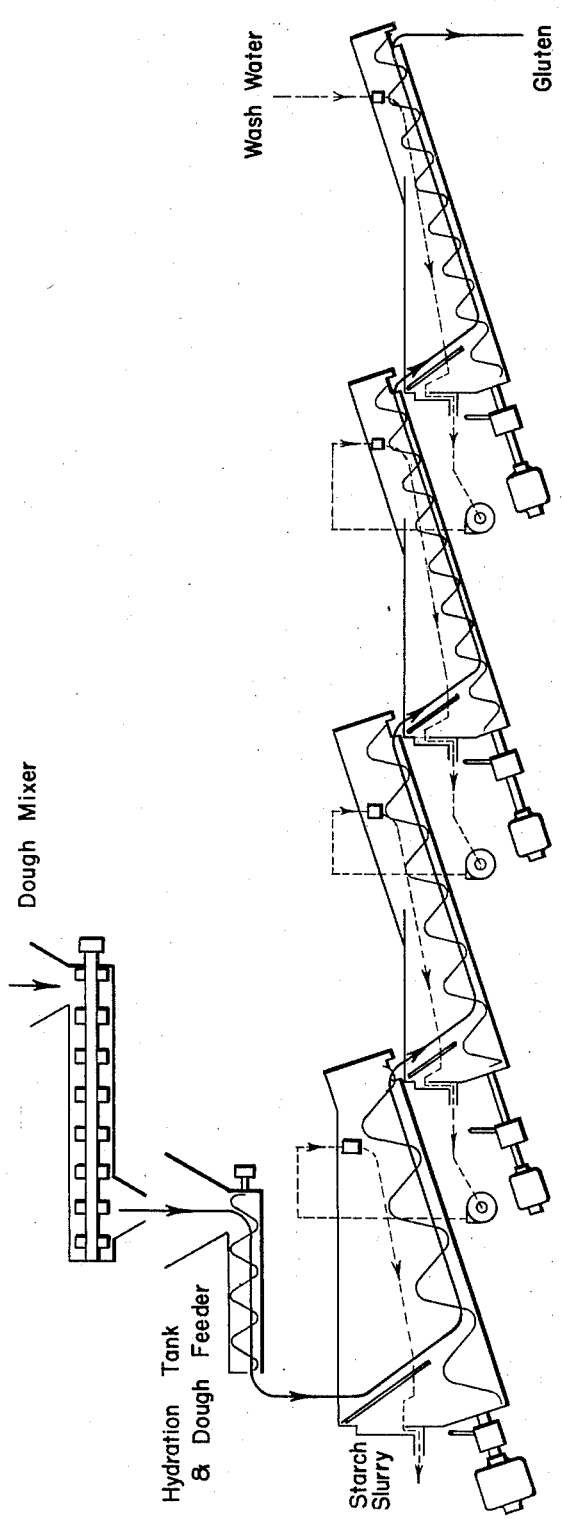

2,555,908

UNITED STATES PATENT OFFICE 2,555,908

STARCH GLUTEN SEPARATION

Joseph J. von Edeskuty, Minneapolis, and John F. Zalar, St. Paul, Minn., assignors to General Mills, Inc., a corporation of Delaware Application April 28, 1949, Serial No. 90,216

14 Claims. (Cl. 127—25)

The present invention relates to a method and apparatus for the separation of starch from gluten in wheat products, particularly flour.

Wheat has been used for a long time as a source of commercial starch. Present-day processes of separating starch from gluten in wheat fall into two categories; first, the kneading processes, and second, the wet-screening processes. The kneading process was the first process developed for this separation, and it involves the liberation of starch by kneading and working a flour dough under a stream of water so that the loosely bound starch is removed. This process depends upon the formation of a dough of sufficient strength such that it can be worked for the liberation of the starch without the dough breaking up into small particles which find their way into the starch.

This method was first used as a batch process. It was frequently carried out in a round-bottom wooden tank provided with a corrugated roller. The roller kneaded and worked the dough, the water entering the tank in the form of a spray. Removal of starch water was accomplished through perforations in the tank. Starch could be effectively removed from the gluten in this type of apparatus, but the capacity of any given piece of equipment was exceedingly small and excessive quantities of wash water were necessitated. The excess quantities of water made the recovery of the starch unduly costly.

A continuous process of effecting the separation of starch from gluten dough in a modified kneading process is to be found in Callaghan et al. Patent 2,388,902. This process is based on the thorough development of the dough prior to the time that the dough was washed with water for the removal of starch. The washing operation in that patent, however, involves the tumbling of the dough in an inclined horizontal drum equipped with agitating flights. In this process the wash water flowed through each unit of the equipment in a parallel flow but the flow was countercurrent in respect to each unit in the line. The operation of the process in this type of equipment is more or less inflexible and does not permit the variations in the process which might be desirable with variations in feed material. In the kneading type process the toughness and cohesiveness of the dough should be such that no gluten breakup occurs in the initial washing stages. This may be dependent in part on the correct development, fat content, bran content, and numerous other inherent factors of the flour. In plant practice with heretofore known kneading processes which are more or less inflexible, it has usually been found necessary to blend flours to overcome any inherent difficulties that may be encountered with any given flour. Thus it may be necessary to blend stronger flours with weaker flours in order to develop a dough of sufficient strength that it can be satisfactorily washed without undue breakup. Moreover the blending of flours was desirable for the purpose of producing a flour mixture which would permit more or less constant operation with minimum difficulty. While this blending of flours to form a more or less uniform feed is also desirable in the present process for simplest operation, the process is much less critical in this respect and it is possible to adapt the operation of the various units to accommodate variations in the feed.

The washing process in the Callaghan et al. patent involves the use of large sized equipment for a given output. Furthermore, since the flow of wash water in any given unit is parallel to the flow of the dough, the operation is less efficient than a strictly countercurrent washing process. Accordingly, while this continuous process is a distinct improvement over prior batch processes, there were still improvements which could be made on this continuous process.

The other currently developed process for separating starch from gluten in wheat is the so-called wet-screening process, in which the agglomeration of the gluten dough is not critical. In this process the flour is mixed with an excess quantity of water to prepare a suspension which is then subjected to screening by vibrating sieves for the separation of the starch from the gluten. The gluten overs on the screen are then repulped in wash water and again passed over screens. This process has the inherent mechanical weakness of any system that requires a large number of vibrating screens, holding tanks, etc. Furthermore, by this process it is difficult to produce a finished gluten of low starch content, and in fact, many of the glutens produced by such a process contain over 10% starch. This starch content in the gluten is a serious disadvantage for such uses of the gluten as the production of monosodium glutamate, or for the production of adhesives. Moreover, any starch present in the gluten represents a reduction in starch yield.

According to the present invention, it has been found that it is possible to subject the developed dough to a particular type of working action for the purpose of washing the starch from the gluten. This improved process is capable of being carried out in simple equipment of much smaller size per unit capacity than the equipment heretofore employed, and effects washing with a reduced power requirement and with reduced washing water requirement.

It is therefore an object of the present invention to provide a novel process for the separation of starch from gluten.

It is another object of the present invention to provide novel apparatus for carrying out this process.

The present invention involves the washing of a developed gluten by means of the peculiar type of working action which is obtainable in a twin interlocking helicoid conveyor operating in an inclined trough. It has been found that the peculiar compression and extending action of the interlocking helicoid conveyors is such as to effect an efficient working of the dough, making possible efficient utilization of the wash fater for the liberation of a maximum amount of starch. The action of these conveyors is such that the dough is apparently compressed when it is enveloped by the interlocking flights, after which it is pushed to the bottom of the trough where it is then distended by the opposing action of the conveyors. This is an efficient means of creating and exposing new surfaces so that the wash water can remove the starch. While the gluten is being so worked for the washing operation, the conveyors also gradually advance the gluten dough forward. It has been found that the flights of the twin conveyors are preferably placed in such a manner that the flight of one conveyor interlocks at about the midpoint of two adjacent flights of the other conveyor. If the flights of the interlocking conveyors are materially displaced from this midpoint, the action of the conveyors is similar to that of a surging pump and does not permit the wash water to cascade down along the shafts and between the flights in the most desired manner. It has also been found desirable to have the two conveyors interlock as much as is practically possible, such that the outer edge of the flights of one conveyor practically contacts the shaft of the other conveyor.

It is apparent that the conveyors in this setup are loaded in normal operation such that the whole space is utilized in actively washing the gluten dough. This is in direct contrast to the rotary drum type of washers employed in the Callaghan et al patent where the working zone is small compared to the size of the equipment. As a consequence, the conveyor type of washer has a tremendous advantage in handling efficiency, and in reduction in size over the tumbler type of washer. Moreover, the washing action is of an entirely different nature. In the interlocking conveyor process the washing action is more positive than it is in the tumbling washer process.

The detailed process will be described with particular reference to the drawings, in which Figure 1 represents a diagrammatic illustration of a plant for the washing of the starch from the gluten dough;

Fig. 2 is a perspective view partly in section showing a typical unit of the washing line; and Fig. 3 is a cross-section through a water inlet distributor.

The dough which is subjected to washing for the separation of the starch, may be prepared in the same manner and from the same materials as that shown in the Callaghan et al. patent referred to above. Usually it is preferred to prepare a dough from clear flours since these are usually low in cost and have substantial quantities of gluten such that a strong dough which resists the breaking-up effect of efficient working may be produced. In most instances it has been found that a dough which is a thin semi-fluid dough is preferred. Thus, for example, doughs composed of water and flour in the approximate proportions of 100 pounds of flour to 80–125 pounds of water are well adpated for the extraction of starch. The amount of water used in the dough depends upon the amount of gluten in the raw material. A high protein wheat usually requires more water for the preparation of a suitable dough than does a low protein wheat. The dough should be of a sufficiently fluid consistency so that it can be readily worked in the interlocking screw conveyor, and at the same time should be sufficiently firm to stick together and not break apart to any appreciable extent in the extracting and washing steps.

With particular reference to Fig. 1, the flour and water are introduced into the dough mixer and are there kneaded in a continuous mixer of the type having paddles which gradually advances the dough toward the discharge end. In general, a temperature range of 60–115° F. has been found satisfactory for extended periods. Some variation outside this range is possible although usually unnecessary inasmuch as it is simple to regulate the temperature within this range, as for example by means of a jacketed dough mixer through which cooling water may be introduced to remove some of the heat developed in the dough mixing. A preferred temperature range is 70–100° F. The working of the dough in the dough mixer should be of an extent sufficient to substantially completely agglomerate the gluten. This results in a more or less continuous network of gluten which clings together and is not readily broken up during the subsequent washing step. After the dough has been agitated sufficiently to agglomerate it, it is discharged into a hydration tank and dough feeder. This may consist of nothing more than a hopper in which the gluten becomes thoroughly hydrated, and a screw conveyor which serves to extrude the dough at a controlled rate into the first starch washer. In the washing line the dough is converted into a gluten mass and a starch slurry. The progress of the dough and the resultant gluten mass are indicated in the solid line, while the wash water and the resultant starch slurry are indicated by the broken line. As will be apparent, the gluten washers are composed of interlocking screw conveyors disposed in troughs set at an angle to the horizontal. Each of these washers is equipped with a separate motor and variable drive, which serves to drive the interlocking screw conveyor. The gluten feed is introduced into the first washer and is conveyed by a baffle in that washer to a point somewhat forward of the lower end of the washer. This serves to separate the incoming dough from the point of discharge of the starch slurry, and thus to avoid any breaking up of the incoming dough or any clogging of the starch discharge port.

The dough entering the first washer is in a relatively fragile condition because of its high content of non-adhesive material (starch, bran, fiber) compared to the content of adhesive material (gluten). In order that the starch, bran, and fiber may be removed from the gluten network without breakup of the network (with resultant gluten loss), it is necessary that the dough be gently kneaded in the presence of water or aqueous slurry. At the same time it is desirable to incorporate a rolling action which will reincorporate any broken gluten fragments back into the dough or gluten mass. The equipment described accomplishes this in the following manner:

Dough entering the first washer drops into a starch slurry held in the trough and falls into the nip of the twin helicoids. It is carried downward, divides, and is carried outward, up and back toward the center, spreading or smearing out into relatively continuous sheets, on the periphery of the helicoids. As it approaches the nip again from two directions it bunches up and is compressed back into a cylindrical shaped mass. This process is repeated as the dough progresses through the washer in the presence of water causing the starch to be washed away (during extension) and causing broken pieces of dough or gluten to be reunited at the compression stage.

The gentle action in the first washer is attained by regulating the speed of the conveyor such that the dough is subjected to as much of a working as its condition permits. Thus an operator can readily observe the action of the dough washer and set the speed of the washer to a point just below that at which the dough starts to break up into small pieces. In this way the most efficient washing is obtained while the breaking up of the gluten is prevented. In this washer the gluten is subject to a countercurrent flow of wash water which has been removed from a subsequent washer and which is introduced near the discharge end of the first washer. This wash water flows countercurrent to the flow of the dough and is discharged near the lower end of the first washer. If desired, any quantity of fresh wash water may be introduced into any point in any washer. Usually, however, it is preferred to introduce all the wash water at the gluten discharge end of the line and to employ a strictly countercurrent washing operation. In some instances it may be desirable to introduce part of the fresh wash water into the first washer for certain grades of flour being processed.

The discharge end of the first washer is elevated such that the gluten is discharged above the normal liquid level in this washer and is, therefore, passed to the second washer without any substantial entrainment of wash water.

In the second, and any desired number of subsequent washers, the gluten is again subjected to this working and washing action while it is being subjected to a countercurrent flow of wash water. In each subsequent washer the gluten may be subjected to a more drastic working inasmuch as up to 90% of the starch contained in the incoming dough may be removed in the first washer. Consequently the gluten dough discharged from this first washer is materially stronger than was the incoming dough in the first washer, and it can accordingly be subjected to much more drastic working in the second washer. To this end the speed of the screws in the second washer may be materially greater than that in the first washer. Moreover, in the second and subsequent washers, it may be desirable to cut the flights of the screws in the manner illustrated in Fig. 2 and to employ dams in the trough for the purpose of reducing the speed at which the dough advances up the screw, and at the same time to permit a squeezing action of the dough between the flights and the dams. In the second washer it is preferred to employ dams of gradually increasing height so that the dough may be subjected to progressively more drastic working. In the third and subsequent washers it is preferred to have all the dams of approximately the same height as the dams shown near the discharge of the washer shown in Fig. 2.

The gluten dough is advanced continuously from one washer to another and is subjected to progressively increasing degrees of working in subsequent washers until a sufficient quantity of the starch has been removed. It will be apparent that any number of washers may be employed to accomplish the desired degree of washing. The gluten is finally discharged from the last washer and may be used for any purpose for which fresh gluten is useful. The fresh wash water is introduced near the top of the final gluten washer and progresses downwardly from there toward the dough inlet end of the washer, from which it is withdrawn and pumped to the gluten discharge end of the previous washer. This wash water then continues through the series of washers in strict countercurrent flow to the flow of the gluten dough, and is finally discharged as a starch slurry from the first gluten washer.

In Fig. 2 there is illustrated the details of construction of one of these washers. The particular washer illustrated is the second washer in line. All of these washers, however, are similar in construction and differ only in details as will be described hereinafter.

The gluten washer is composed of a pair of interlocking screws 11 and 12 which are supported in a trough 13. The screws are suitably supported in the trough by bearings and seals 14 and 15, and are geared for rotation in opposite directions by means of intermeshing gears 16 and 17. A shaft 18 extends outwardly from one of the screws and is supplied with a suitable power unit for rotating the screw at a controlled speed.

The screws are equipped with flights 20 which are spaced approximately at the midpoint of corresponding flights on the other screw such that a more or less uniform and constant working action of the dough is obtained. Moreover the flight of one screw intermeshes with the other screw to the extent that its outer edge is practically in contact with the shaft of the other screw. Part way up the washer the flights are cut and a series of dams 21, 22, 23, and 24 which are attached to the trough, are provided. These dams in the figure are of progressively increasing height. The cut end of the screw conveyor flight serves to press the dough between the flight and the dam and subject it to a sort of squeezing action. Thereafter, the dough is elevated over the end of the dam and is transferred to the next section of the washer. It will be apparent that the extent to which the dough is retained by each of the dams is dependent upon the height of the dam and the ease with which the dough is lifted over the dam on each revolution of the screw conveyor.

Near the upper end of the washer there is provided a wash water distributor generally indicated as 30. This may be of the type illustrated in section in Fig. 3. The distributor is composed of a box 31 which is open at the top. Across the top there is provided a partial closure member 32 which extends across the length of the distributor, but which is separated from the sides of the box 31 by spaces 33. A suitable inlet pipe 34 is fastened in this top closure member and supporter thereon. A suitable hose or other flexible connection 35 is provided for connecting the distributor to the pump or other source of wash liquid. The distributor may be suitably supported on the sides of the trough and may be movable along the trough to introduce the wash water at any desired point. The incoming liquid fills the box and then flows out of the top cascading down across the width of the trough to effect a more or less uniform distribution of the water over the width of the trough. In place of this distributor, almost any type of water spray device may be used. For example, a simple fish-tail type of spray is satisfactory.

The trough is provided with an upper extension 40 near the lower portion of the trough which permits the maintenance of a liquid level above the top of the screw conveyors in the lower portion of the trough. An inclined baffle 41 extends between the walls of the upper extension 40 and serves to introduce the dough into the washer at a point slightly removed from the starch slurry discharge so as to avoid any clogging of the discharge.

The lower end wall 42 of the upper extension 40 is provided with an opening 43 for discharge of starch slurry. A discharge box 44, which may be open at the top, surrounds the opening 43. This box is provided with a pipe connection 45 which may be suitably connected to pipes or hoses for conducting the starch slurry to the next washer or to recovery. An adjustable weir 46 is provided for regulating the liquid level in the trough. This weir is adjustably supported between vertical guides (not shown) which seal the weir against the end wall 42 and permit the upper edge of the weir to determine the liquid level in the trough.

The respective washers in the washing line may all have the same fundamental characteristics in that they are composed of interlocking screw conveyors which serve to work the dough and wash it as it progresses up an incline toward discharge. The individual washers may differ however in the use of continuous screws or by the use of screws having interrupted flights, such as those indicated in Fig. 2. Moreover, the washers may be provided with dams of the same height or progressively increasing height or it may be desirable to omit the dams entirely in some instances. Inasmuch as the starch is continuously being removed from the dough, the volume of material being treated is reduced and accordingly the size of washers subsequent to the initial washer may be of reduced size. Furthermore, since it is desirable to increase the intensity of working in subsequent washers, they are usually operated at increased speeds and accordingly the throughput of a given sized unit is greater.

Some variation is possible in the angle at which the units are set. In general, this angle should be between 10° and 15° and preferably between 12° and 14° from the horizontal.

The following example will serve to illustrate one manner in which the process may be carried out.

A dough was prepared from 100 parts of flour and 80 parts of water. The flour was one which contained about 60% starch and about 15% gluten. The dough was developed as previously described and then discharged into a washer setup composed of five washers, the first of which contained a 9" twin conveyor which was continuous, and the trough did not contain any dams. In this operation the dough was fed from the mixer at 3000 pounds per hours and was washed with water at the rate of 14 gallons per minute, a small part of which was introduced into the first washer directly behind the feed stream of dough, and the major portion of which was introduced into the fifth washer. The conveyor was operated at speeds of about 21 R. P. M., and a starch slurry having Baumé of 6.5-7 was taken off this washer. Approximately 90% of the starch in the incoming dough was washed out of the dough in this washer, and the gluten discharged therefrom contained approximately 25% starch. The action of this washer on the soft dough was relatively gentle and served to remove the loosely bound starch and condition the gluten for more vigorous treatment in subsequent washers. Any tendency of the dough to break up was prevented by controlling the Baumé of the starch slurry to the range indicated above.

The gluten dough was then discharged into the second washer which was also a 9" twin conveyor washer similar to the first washer with the exception that a series of cuts were made in the flight and steel dams were placed in the trough at the point of these cuts as shown in Fig. 2. The gluten dough entering the second washer contained about 25% starch. The physical characteristics of the dough at this point were such that it was easily conveyed and easily withstood the working activity without breaking up. This washer was operated at about 49 R. P. M. and served to reduce the starch content of the gluten dough to about 11%.

The remainder of the washers were set up in a manner similar to the second washer. They were composed of twin conveyors having diameters of 6", 4", and 4" respectively. Besides a variation in conveyor size, the remaining three washers varied also in dam sizes and spaces as well as in the speed of revolution. These last three conveyors were operated at speed of 83, 133, and 131 R. P. M. respectively. The starch content of the gluten entering the third washer was about 11% and this was reduced to 4% or lower at the point of discharge from the last washer.

It is apparent from the foregoing description that the present process provides a simple and economical process for the separation of starch from gluten. The apparatus has a high capacity for a given size; the floor space occupied is small in comparison to the floor space occupied by other equipment used for this purpose; the individual washer units are capable of independent control thereby making possible the variation in operating conditions necessary for variations in feed material. Moreover the process is extremely efficient resulting in the reduction in the starch content of the gluten to a point below that heretofore economically attainable. At the same time a minimum of wash water is employed, thereby simplifying the problem of starch recovery.

While numerous modifications of the invention have been described, it will be apparent that other modifications are also possible without departing from the spirit of the invention.

We claim as our invention:

1. Apparatus for separating starch from gluten in a dough, comprising a trough disposed at an angle to the horizontal, an interlocking screw conveyor disposed in said trough, a discharge opening for gluten at the upper end of the trough, an inlet for wash water near the upper end of the trough, and a discharge opening for starch slurry near the lower end of the trough and disposed above the level of the interlocking screw conveyor.

2. Apparatus according to claim 1 in which the flight of one screw extends at about the midpoint between a pair of flights of the other screw and the outer edge of one flight is almost in contact with the shaft of the other screw.

3. Apparatus according to claim 1 in which the flights of the interlocking screw conveyors are cut at a series of points and a series of dams are disposed in the trough at the point at which the flights are cut.

4. Apparatus according to claim 3 in which the dams increase in height toward the upper end of the trough.

5. Apparatus for separating starch from gluten in a dough comprising a trough extending upwardly at an angle to the horizontal, an interlocking screw conveyor disposed in the bottom of said trough, an opening in the bottom of the upper end of said trough for discharge of gluten, an inlet for wash water near the upper end of the trough, an upper extension for the sides of said trough disposed near the lower end of the trough and a discharge opening for starch slurry in the lower end of the extension.

6. Apparatus according to claim 5 in which the flight of one screw extends at about the midpoint between a pair of flights of the other screw and the outer edge of one flight is almost in contact with the shaft of the other screw.

7. Apparatus according to claim 5 in which the flights of the interlocking screw conveyors are cut at a series of points and a series of dams are disposed in the trough at the point at which the flights are cut.

8. Apparatus according to claim 7 in which the dams increase in height toward the upper end of the trough.

9. An apparatus according to claim 5 in which there is provided a weir adjustable over the discharge opening for wash water for regulating the liquid level in the trough.

10. Process of separating starch from gluten which comprises preparing a developed dough containing wheat starch and wheat gluten, introducing the dough into an elongated washing zone adjacent one end thereof, introducing wash water into said washing zone adjacent the other end thereof, subjecting the dough in said washing zone to a series of working operations including sequentially compressing said dough by applying forces to the dough laterally inwardly near the top of the washing zone, moving the compressed dough downwardly to the bottom of the washing zone, then applying forces to said dough laterally outwardly and upwardly to extend and disrupt the dough and recombining the disrupted dough portions near the top of the washing zone preparatory to the next compression step, gradually advancing the dough from said one end to said other end while subjecting it to said working operations, and separating the resultant gluten from the resultant starch slurry.

11. Process according to claim 10 in which the washing zone extends longitudinally upwardly and the dough is introduced into the lower end and discharged from the upper end thereof above the level of the wash water therein.

12. Process according to claim 11 in which the dough is subjected to a series of washing operations, the intensity of the action in each subsequent washing zone being more intense than in the preceding washing zone.

13. Process of separating starch from gluten which comprises preparing a developed dough containing wheat starch and wheat gluten, introducing the dough into an elongated washing zone adjacent one end thereof, introducing wash water into said washing zone adjacent the other end thereof, subjecting the dough in said washing zone to a series of working operations including sequentially compressing said dough by applying forces to the dough laterally inwardly near the top of the washing zone, moving the compressed dough downwardly to the bottom of the washing zone, and applying forces to said dough laterally outwardly and upwardly to extend and disrupt the dough and combining the disrupted dough portions near the top of the washing zone preparatory to the next compression step, gradually advancing the dough upwardly at an angle to the horizontal from said one end of the washing zone to a point above the liquid level in said washing zone adjacent said other end thereof while subjecting the dough to said working operations, discharging the gluten to a subsequent washing zone, withdrawing wash water in the form of a starch slurry, and introducing it as wash water in a preceding dough washing step.

14. Process according to claim 13 in which the intensity of the washing action in each subsequent washing zone is more intense than in the preceding washing zone.

JOSEPH J. von EDESKUTY.
JOHN F. ZALAR.

REFERENCES CITED

The following references are of record in the file of this patent:

UNITED STATES PATENTS

| Number | Name | Date |
|---|---|---|
| 155,602 | Wiegand | Oct. 6, 1874 |
| 2,388,902 | Callaghan | Nov. 13, 1945 |